United States Patent
McMaster et al.

(10) Patent No.: US 10,949,864 B2
(45) Date of Patent: Mar. 16, 2021

(54) SMART VEHICLE NAVIGATION AND TRACKING SYSTEM

(71) Applicants: Orlando McMaster, Weston, FL (US); Eustace P. Isidore, Austin, TX (US)

(72) Inventors: Orlando McMaster, Weston, FL (US); Eustace P. Isidore, Austin, TX (US)

( * ) Notice: Subject to any disclaimer, the term of this patent is extended or adjusted under 35 U.S.C. 154(b) by 277 days.

(21) Appl. No.: 16/005,676

(22) Filed: Jun. 11, 2018

(65) Prior Publication Data
US 2018/0293595 A1    Oct. 11, 2018

Related U.S. Application Data

(63) Continuation-in-part of application No. 14/924,707, filed on Oct. 27, 2015, now abandoned, which is a
(Continued)

(51) Int. Cl.
| | |
|---|---|
| G06Q 30/02 | (2012.01) |
| G06Q 20/10 | (2012.01) |
| H04L 29/08 | (2006.01) |
| H04W 4/40 | (2018.01) |
| H04W 4/21 | (2018.01) |
| H04W 4/024 | (2018.01) |
| G01C 21/36 | (2006.01) |
| H04W 4/24 | (2018.01) |
| H04L 29/14 | (2006.01) |
| H04M 15/00 | (2006.01) |

(Continued)

(52) U.S. Cl.
CPC ......... *G06Q 30/02* (2013.01); *G01C 21/3626* (2013.01); *G06Q 20/10* (2013.01); *G06Q 20/3224* (2013.01); *G06Q 30/0215* (2013.01); *H04L 67/10* (2013.01); *H04L 67/18* (2013.01); *H04L 67/22* (2013.01); *H04L 69/40* (2013.01); *H04M 15/8083* (2013.01); *H04W 4/024* (2018.02); *H04W 4/21* (2018.02); *H04W 4/24* (2013.01); *H04W 4/40* (2018.02); *H04W 64/00* (2013.01)

(58) Field of Classification Search
CPC ......... H04W 4/024; H04W 4/21; H04W 4/40; H04W 4/24; G01C 21/3626; G06Q 20/10; G06Q 20/3224; H04L 67/10; H04L 67/18; H04L 67/22; H04L 69/40; H04M 15/8083
USPC .................................................. 701/25, 410
See application file for complete search history.

(56) References Cited

U.S. PATENT DOCUMENTS

| | | |
|---|---|---|
| 8,364,165 B2 | 1/2013 | Seacat et al. |
| 8,473,198 B2 | 6/2013 | Krumm et al. |

(Continued)

*Primary Examiner* — Peter D Nolan
*Assistant Examiner* — Luat Huynh
(74) *Attorney, Agent, or Firm* — Isidore PLLC (57) ABSTRACT

A computer implemented method includes: receiving location information and data about a pre-established trip from one or more vehicles each having a respective navigation device; retrieving a comprehensive computerized map of parking spaces and tow zones within a target area; a processor of the data processing system providing navigation information that enables vehicle operators to locate at least one of approved parking spaces and safe parking spaces; and the processor providing alerts for drivers to avoid parking in tow zones and other restricted parking spaces in response to receipt of location information which indicates the driver's vehicle is in close proximity of a restricted parking space.

10 Claims, 7 Drawing Sheets

Related U.S. Application Data continuation of application No. 13/004,018, filed on Jan. 10, 2011, now abandoned.

(60) Provisional application No. 61/293,273, filed on Jan. 8, 2010.

(51) Int. Cl.
*G06Q 20/32* (2012.01)
*H04W 64/00* (2009.01)

(56) References Cited

U.S. PATENT DOCUMENTS

| | | |
|---|---|---|
| 8,972,166 B2 | 3/2015 | Donovan et al. |
| 2009/0111462 A1 | 4/2009 | Krinsky et al. |
| 2009/0140887 A1* | 6/2009 | Breed ................. G08G 1/0112 340/990 |
| 2009/0210302 A1* | 8/2009 | Tashev ................. G06Q 10/047 705/14.69 |
| 2009/0287408 A1* | 11/2009 | Gerdes ............... G01C 21/3423 701/533 |
| 2010/0156670 A1* | 6/2010 | Hamilton, II .... G08G 1/096741 340/928 |
| 2011/0208646 A1 | 8/2011 | McMaster et al. |

\* cited by examiner

| | C1 502 | C2 504 | C3 506 | C4 508 Vehicle's current location between A and B | C5 510 | C6 512 | C7 514 |
|---|---|---|---|---|---|---|---|
| Row 501 | Route | Congestion level | Credit/Cash reward efficiency rank | Energy efficiency rank | Distance rank | Time/Schedule efficiency rank | Energy expenditure rank |
| R1 503 | BDF | Severe: 5 | fourth: $0.00 per unit distance | fourth | first | fourth | fourth |
| R2 505 | BEF | Low: 2 | first: $0.05 per unit distance | first | third | second | first |
| R3 507 | BCF | Medium: 3 | third: $0.03 per unit distance | third | second | first | second |
| R4 509 | BJF | Low: 2 | second: $0.04 per unit distance | first | fourth | third | third |

SMART VEHICLE NAVIGATION AND TRACKING SYSTEM

PRIORITY

This application is a continuation in part of U.S. patent application Ser. No. 14/924,707, filed Oct. 27, 2015, which is a continuation of U.S. application Ser. No. 13/004,018, filed Jan. 10, 2011, which claims benefit of provisional application Ser. No. 61/293,273, filed Jan. 8, 2008.

BACKGROUND

1. Technical Field

The present invention generally relates to smart highways and vehicle navigation systems and in particular to smart highways and vehicle navigation systems integrated with social media.

2. Description of the Related Art

Traditionally, smart highway systems utilize an elaborate/expensive system of sensors and cameras to provide information pertaining to the flow of traffic. This traffic flow information includes movement data such as average velocities, congestion data and information pertaining to alternate routes. Furthermore, smart highway systems may allow a driver to identify and drive along routes which provide a smooth (i.e., low levels of congestion) traffic flow. However, the conventional approach to the operation of smart highway systems leads to high developmental/maintenance costs and long waiting periods before the system may provide benefit to vehicle operators.

With membership in the hundreds of millions, community networking websites collectively comprise members of virtually all demographics and interests. Members of social networking sites readily share information about their activities with their online friends. This information is generally provided by manually entry of data via a wired or wireless electronic device. As a result, this information is generally not provided in an automatic/real time manner. In some cases, at the time of the event of interest, manual data entry may not be convenient or safe to efficiently relay information to friends. For example, a registered user who attempts send text messages to friends while driving may present a safety hazard to other drivers. Furthermore, manual operation of a cell phone and certain cell phone related functions while driving may be illegal in some locations. Nevertheless, community networking websites may be a useful media for receiving information from other members but, traditionally, community networking websites have not effectively utilized the power of the social/community network to provide real-time and beneficial information to members as these members demand such information.

BRIEF SUMMARY

Disclosed are a method, a system and a computer program product for developing interactive smart highway systems and intelligent vehicle tracking/navigation systems. The intelligent navigation and vehicle tracking (INVT) utility executes on a data processing system and collects/generates vehicle activity and location information for vehicles equipped with an intelligent navigation device. In particular, the INVT utility obtains GPS/location data for various vehicles from information provided by the corresponding navigation device. The INVT utility uses the received location information to calculate congestion and identify alternate routes. Additionally, the INVT utility provides an incentive mechanism for motorists to receive credit/cash rewards for selecting less congested routes. In addition, the INVT utility utilizes congestion data to determine the time efficiency and energy efficiency for traveling along particular routes. Furthermore, the INVT utility enables motorists to select routes based on energy expended, time expended and/or available credit/cash rewards.

The INVT utility also assists vehicle operators to locate approved/safe parking spaces/areas and zones. The INVT utility creates a current and comprehensive map of parking spaces and tow zones within various target areas. In particular, the INVT utility provides alerts for drivers to avoid parking in tow zones and other restricted parking spaces when the INVT utility receives location information for a driver's navigation device which information indicates the driver is approaching a restricted parking space. The INVT utility enables drivers to utilize a network of drivers to warn drivers of towing activity and illicit/theft activities pertaining to vehicles. The INVT utility may utilize the drivers' network to provide drivers with a preview of route conditions further ahead. For example, a driver several miles ahead of other drivers may anonymously/automatically alert drivers of speed limits and/or active speed tracking operations based on radar signal detection, according to location data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for developing interactive smart highway systems and intelligent vehicle tracking/navigation systems. The intelligent navigation and vehicle tracking (INVT) utility executes on a data processing system and collects/generates vehicle activity and location information for vehicles equipped with an intelligent navigation device. In particular, the INVT utility obtains GPS/location data for various vehicles from information provided by the corresponding navigation device. The INVT utility uses the received location information to calculate congestion and identify alternate routes. Additionally, the INVT utility provides an incentive mechanism for motorists to receive credit/cash rewards for selecting less congested routes. In addition, the INVT utility utilizes congestion data to determine the time efficiency and energy efficiency for traveling along particular routes. Furthermore, the INVT utility enables motorists to select routes based on energy expended, time expended and/or available credit/cash rewards.

The INVT utility also assists vehicle operators to locate approved/safe parking spaces/areas and zones. The INVT utility creates a current and comprehensive map of parking spaces and tow zones within various target areas. In particular, the INVT utility provides alerts for drivers to avoid parking in tow zones and other restricted parking spaces when the INVT utility receives location information for a driver's navigation device which information indicates the driver is approaching a restricted parking space. The INVT utility enables drivers to utilize a network of drivers to warn drivers of towing activity and illicit/theft activities pertaining to vehicles. The INVT utility may utilize the drivers' network to provide drivers with a preview of route conditions further ahead. For example, a driver several miles ahead of other drivers may anonymously/automatically alert drivers of speed limits and/or active speed tracking operations based on radar signal detection, according to location data.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
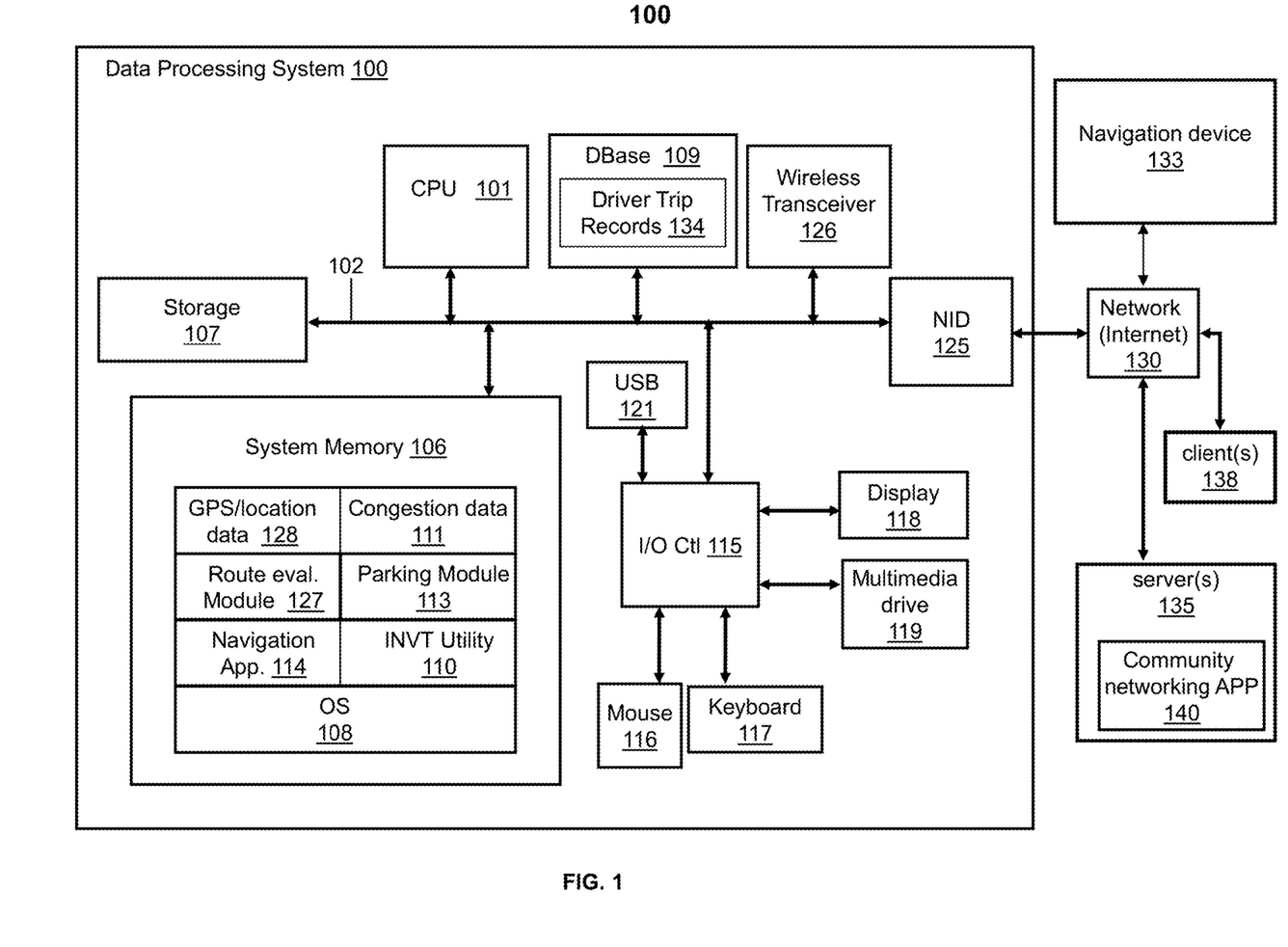
FIG. 1 provides a block diagram representation of an example data processing system within which certain features of the invention may be practiced, according to one embodiment.

With reference now to the figures, and beginning with FIG. 1, there is depicted a block diagram representation of an example data processing system (DPS), as utilized within one embodiment. DPS may be a server, a personal computer, a portable device, such as a personal digital assistant (PDA), a smart phone, and/or other types of electronic devices that may generally be considered processing devices. For example, DPS may represent a traffic information and navigation server. As illustrated, DPS 100 comprises at least one processor or central processing unit (CPU) 101 connected to system memory 106 via system interconnect/bus 102. Also connected to system bus 102 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also comprises storage 107, within/from which data/instructions/code may also be stored/retrieved. Database 109 is also connected to system bus 102 of DPS 100, within/from which specific data, for example, driver trip records 134 may also be stored/retrieved.

DPS 100 is also illustrated with wireless transceiver 126, which may receive and transmit signals from/to display monitors and receivers located in an environment that is within a wireless range of wireless transceiver 126. To further enable external network connection, DPS 100 also includes network interface component (NIC), also referred to as network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NIC/NID 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 135, which may also provide data/instructions/code for execution on DPS 100, in one embodiment. In one embodiment, social/community networking site 140 is illustrated within server 135. DPS 100 may also connect to one or more clients 138 and/or one or more devices 133 via network 130.

In addition to the above described hardware components of wireless system 100, various features of the invention are completed/supported via software (or firmware) code or logic stored within memory 106 or other storage and executed by Processor 101. Thus, for example, illustrated within memory 106 are a number of software/firmware/logic components, including operating system (OS) 108, navigation application 114, congestion data 111, route evaluation module 127 and parking module 113. In addition, memory 106 comprises GPS/Location data 128 and intelligent navigation and vehicle tracking (INVT) logic/utility 110. In actual implementation, INVT logic 110 may be combined with application 114, route evaluation module 127 and parking module 113 to provide a single executable component, collectively providing the various functions of each individual component when the corresponding combined component is activated. For simplicity, INVT logic 110 is illustrated and described as a stand alone or separate logic/firmware component, which provides specific functions, as described below.

In one embodiment, server 135 represents a software deploying server, and DPS 100 communicates with the software deploying server (135) via network (e.g., Internet 130) using NID 125. Then, INVT utility 110 may be deployed from/on the network, via software deploying server 135. With this configuration, software deploying server performs all of the functions associated with the execution of INVT utility 110. Accordingly, DPS 100 is not required to utilize internal computing resources of DPS 100 to execute INVT utility 110.

Certain of the functions supported and/or provided by INVT utility/logic 110 are implemented as processing logic (or code) executed by processor 101 and/or other device hardware, which processing logic completes the implementation of those function(s). Among the software code/instructions/logic provided by INVT logic 110, and which are specific to the invention, are: (a) logic for obtaining location information for a respective vehicle; (c) logic for generating congestion data for specific routes based on location information from a set of vehicles; (d) logic for obtaining credit/cash rewards efficiency data for specific routes based on congestion data from a set of vehicles; (e) logic for obtaining energy efficiency data for specific routes based on (i) congestion data and (ii) variations in acceleration rates from a set of vehicles; and (f) logic for applying a credit/cash reward to an account of a driver for utilizing particular driving routes. According to the illustrative embodiment, when Processor 101 executes INVT logic 110, DPS 100 initiates a series of functional processes that enable the above functional features as well as additional features/functionality. These features/functionalities are described in greater detail below within the description of FIGS. 2-7.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figure 2:
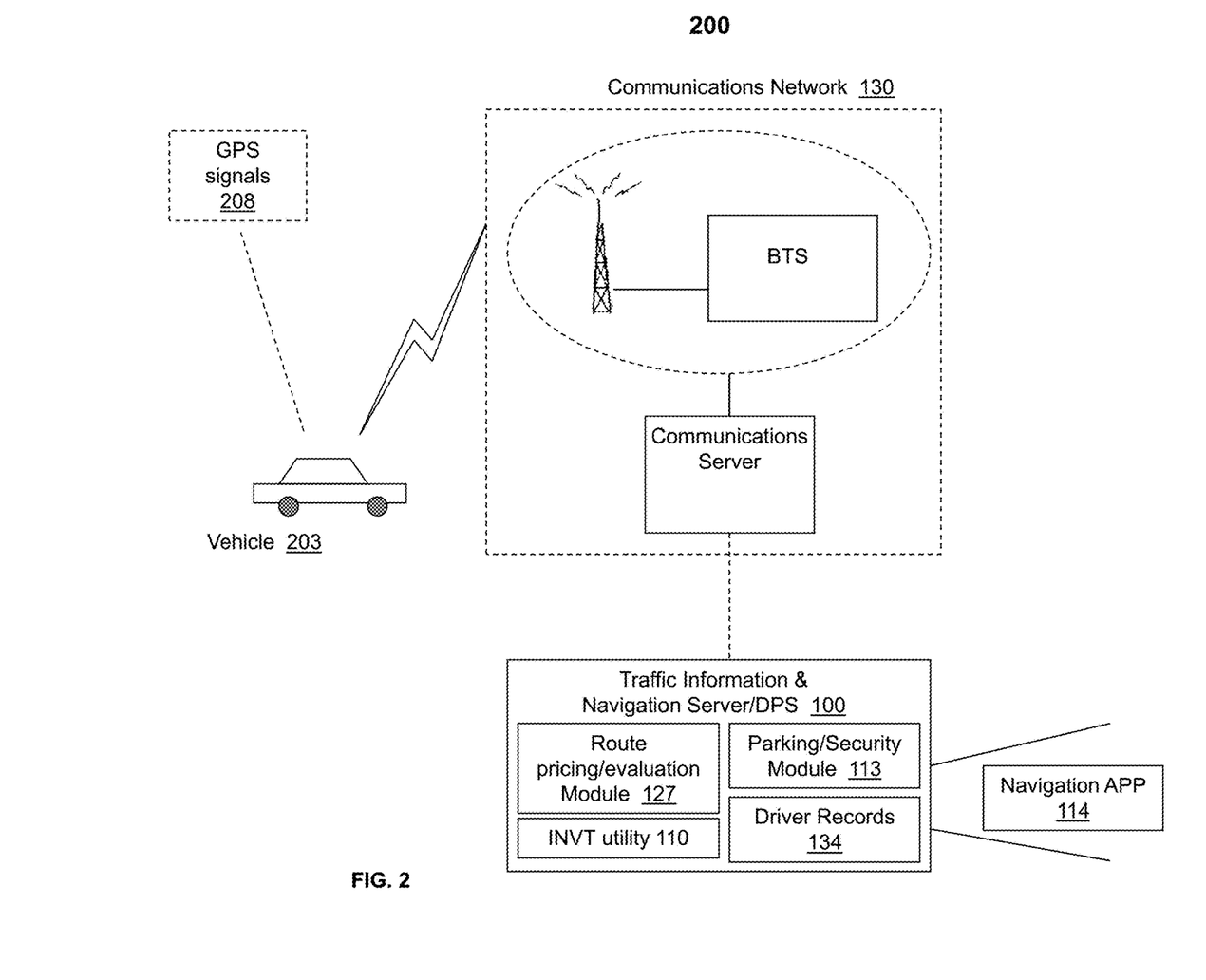
FIG. 2 illustrates a vehicle equipped with a navigation device which communicates with a traffic information and navigation server via a wireless communication network, according to one embodiment.

With reference now to FIG. 2, a vehicle equipped with a navigation device communicates with a traffic information and navigation server via a wireless communication network, according to one embodiment. Network 200 comprises vehicle 203 which utilizes GPS receiver 218 (FIG. 3) of navigation device 133 (FIG. 1, FIG. 3) to receive GPS (information) signals 208 from GPS satellites (not explicitly shown). Navigation device 133 forwards information from GPS signals 208 to Traffic Information & Navigation Server/DPS 100 via wireless communications network 130. Traffic Information & Navigation Server 100 comprises navigation application 114, congestion data 111, route evaluation module 127 and parking module 113. In addition, Traffic Information & Navigation Server 100 comprises GPS/Location data 128 and intelligent navigation and vehicle tracking (INVT) logic/utility 110.

INVT utility 110 utilizes navigation application/engine 114 to process GPS information 208 to obtain GPS/Location data 128. In one embodiment, INVT utility 110 receives driver ID for navigation device 133 in order to link navigation device 133 to pre-configured trip data 228. In another embodiment, individual 212 performs authentication operations from navigation device 133 in order to link pre-configured trip data 228 to navigation device 133.

INVT utility 110 utilizes current and previously compiled GPS/Location data 128 to determine vehicle position, vehicle speeds/velocities, and congestion levels. In one embodiment, navigation device 133 generates GPS/Location data 128 from GPS information 208 to obtain vehicle location. INVT utility 110 determines vehicle speed/velocity and average vehicle speed of a group of motorists along a route and/or within a particular area or cellular network sector. In one embodiment, location data 128 (which provides the position of vehicle 203) is determined by position analysis of signals associated with the detection of a wireless device/module (e.g., wireless transceiver 232 (FIG. 3)) by a wireless communication network. In one embodiment, since mobile subscribers may utilize different wireless networks, INVT utility 110 compiles vehicle location/movement data from various communication networks in order to generate accurate congestion data and route efficiency data. In one embodiment, INVT utility 110 determines levels of correlation between current traffic/location data and historical traffic/location data and applies these levels of correlation to historical congestion data and historical route efficiency data to determine the current measurements for congestion data and route efficiency data. In particular, the use of correlation calculations facilitates the calculation of congestion levels/data especially when location data is received from a sub-threshold number of vehicles.

Figure 3:
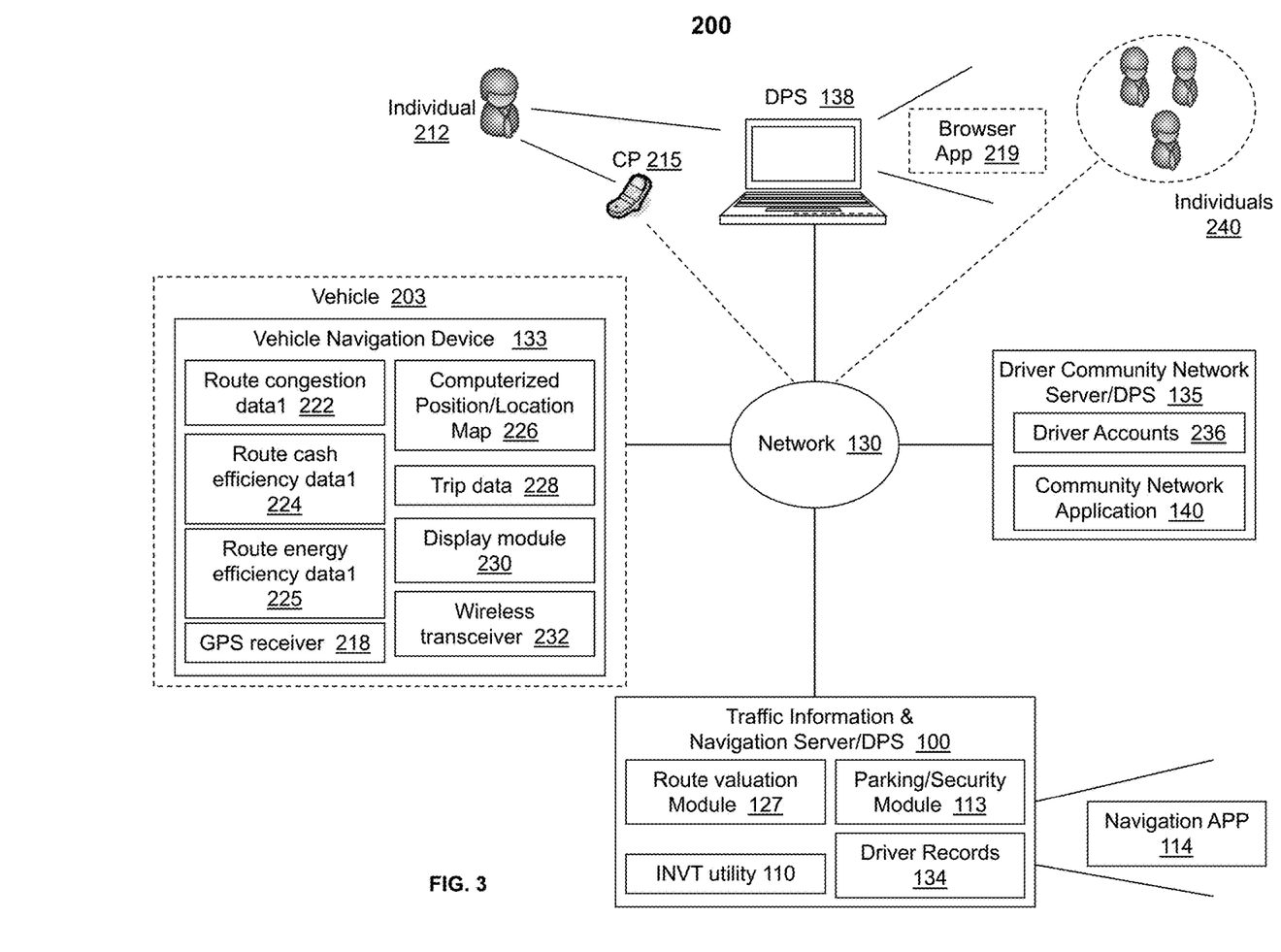
FIG. 3 is an illustration of a driver with communication access to a traffic information and navigation server and a driver networking application server, within the communication network of FIG. 2, which servers enable the driver to pre-configure a trip, according to one embodiment.

FIG. 3 is an illustration of a driver with communication access to a traffic information and navigation server and a driver networking application server, within the communication network of FIG. 2, which servers enable the driver to plan/pre-configure a trip, according to one embodiment. Network 200 comprises first server 100, navigation device 133 and second server 135. In addition, Network 200 comprises DPS 138 and cellular telephone 215 are electronic devices by which individual 212 connects to network 130. First server 100 comprises navigation application 114 and INVT utility 110. Navigation device 133 includes computerized GPS/location information map 226, GPS receiver 218, wireless transceiver 232 and display module 230. Navigation device 133 also includes route congestion data1 222, route cash efficiency/reward data1 224, route energy efficiency data1 225 and trip data 228. Second server 135 comprises driver/member accounts 236 and community networking application 140. In one embodiment, DPS 100 and DPS 135 are separate/independent entities. In another embodiment, DPS 100 and DPS 135 are integrated within a single server. Furthermore, the illustrated components of DPS 100 and DPS 135 may be integrated with community networking application 140.

In Network 200, INVT utility 110 enables individual 207 to utilize browser application 219 on DPS 138 to access driver records/account provided by navigation application 114/community network application 140. In addition, individual 212 has the option of accessing driver records by using cellular telephone (CP) 215. INVT utility 110 enables the driver/individual 212 to plan trips and pre-configure navigation settings to select routes for a trip based upon cash/credit reward per unit distance, efficiency levels and/or rank of routes, route segments and/or the overall trip. INVT utility 110 provides a driver with a forecast of rewards, costs and/or efficiency benefits for planned trips based on data of historical averages.

Vehicle 203 is physically and/or electrically coupled to navigation device 133 which utilizes GPS receiver 218 to obtain corresponding GPS information 208. Navigation device 133 forwards GPS information 208 via communication network 130 to Traffic Information & Navigation Server/DPS 100.

INVT utility 110 uses the received information including average vehicle speed, speed variations, and established speed limit along particular routes to calculate congestion. In addition, INVT utility 110 uses a set of location measurements to determine acceleration rates and rates of change of acceleration. In one embodiment, INVT utility 110 receives speed/velocity, acceleration information from circuitry directly linking speedometer/accelerometer signals to the vehicle navigation device. As a result, INVT utility 110 is able to determine correlate speed/acceleration variations of a vehicle, generally associated with higher levels of congestion, with various rates of fuel/energy utilization. INVT utility 110 determines the energy efficiency and/or expenditure rating by utilizing one or more of: (a) the speed/acceleration variations data; (b) the distance along a route; and (c) the average speed along the route. In one embodiment, the energy efficiency rating is expressed as normalized energy expended per unit distance. The (normalized) energy expended is the product of the energy efficiency rating and the distance traveled. Thus, INVT utility 110 is able to determine the normalized energy expended for a particular route and compare the energy expended on a first route relative to the energy expended on a second route. INVT utility 110 determines congestion information/levels on a primary route and on alternate routes relative to a particular GPS location.

INVT utility 110 enables individual 212 to pre-configure trip data 228 to enable driver/individual 212 to select the alerts that driver/individual 212 wishes to receive in response to reaching/crossing particular reference/trigger points. These reference/trigger points include one or more of: (a) a preset distance of travel; (b) type of business; (c) new city; (d) landmarks; and (e) other reference points. For example, in order to facilitate the provision of a city tour, a tour operator/driver/individual 212 may pre-configure via navigation application 114 a schedule of alerts/notifications triggered by an arrival within a threshold distance of particular landmarks/trigger points, based upon GPS location information 128. As another example, a driver may wish to be alerted about the nearest petrol station after every 180 miles driven. In one embodiment, if the driver (verbally) indicates (via a speech recognition module within navigation device 133) a desire to drive to an announced/indicated petrol station, INVT utility 110 provides directions to the petrol station and subsequently from the petrol station to resume travel along the previous route.

INVT utility 110 enables individual 212 and friends to respectively pre-configure trip data (e.g., trip data 228) to enable driver/individual 212 and friends to track each other within multiple/corresponding cars on a trip/road. INVT utility 110 enables individual 212 to provide user names for corresponding drivers that are to be tracked by driver 212 via navigation device 133. INVT utility 110 provides driver 212 with alerts indicating names/IDs and distance/directions of other/tracked drivers, following receipt of approval/authorization by the corresponding drivers.

INVT utility 110 also enables vehicle operators to locate approved/safe parking spaces/areas and zones. INVT utility 110 creates a current and comprehensive computerized map of parking spaces and tow zones within a target area. INVT utility 110 downloads a file of the map of parking spaces and tow zones to navigation device 133. Navigation device 133 provides a dynamic display which shows the position of the vehicle relative to parking spaces and tow zones on the map. INVT utility 110 provides alerts for drivers to avoid parking in tow zones and other restricted parking spaces when INVT utility 110 receives GPS/location information which indicates the driver's vehicle is in close proximity of a restricted parking space.

INVT utility 110 provides alerts for individuals 240 who do not receive or heed a previous alert. For example, the use of an active or passive vehicle navigation system may determine the steps by which a driver is alerted. INVT utility 110 sends alerts to other linked devices including the driver's cell phone and/or a friend's phone, for example. INVT utility 110 prevents vehicle thefts by characterizing activity around a driver's vehicle. In one embodiment, INVT utility 110 utilizes motion sensor devices/cameras to record unusual activity around the vehicle and alert the driver who is able to view corresponding live/recorded content via an electronic device. If there is an attempt to steal/damage the vehicle, INVT utility 110 receives information, according to the level of security breach. For example, INVT utility 110 may determine that an attempt of vehicle theft is occurring depending upon one or more of: (a) detection of contact to the vehicle; (b) the location of the vehicle; (c) the method by which the vehicle is moved/started, for example, without a key. When INVT utility 110 determines that a vehicle is being stolen, INVT utility 110 notifies the owner/driver and the relevant law enforcement authorities. If the vehicle is moved because of theft and/or by a tow truck, INVT utility 110 continues to receive information about the vehicle's location in order to track the location of the vehicle. In one embodiment, INVT utility 110 may receive signals from a hidden transmitter device on/within vehicle 203.

When a vehicle is stolen/towed within specific proximity, INVT utility 110 notifies drivers of vehicles in same/nearby zone of theft/towing activity by matching location/zone positions of identified vehicles. INVT utility 110 enables an observant individual to use an electronic device to trigger an alert to impending "vehicle tow casualties" (i.e., drivers whose vehicles are towed) by providing via navigation application 114 license plate information of (a) imminently at risk vehicles and (b) the towing vehicle. INVT utility 110 discreetly identifies the at risk vehicle(s) and sends an alert(s) to the owner/driver. In one embodiment, INVT utility 110 may also notify owner's friends on behalf of owners, according to preset configurations via navigation application 114. INVT utility 110 may determine when owners/friends are visiting particular establishments/locations. When a critical/threshold number of pending alerts are linked by respective driver to particular establishments, INVT utility 110 may send notification to (registered) establishments (to make announcement) to alert drivers about towed/stolen vehicles or that vehicles are located in specific tow/hi-risk zone. INVT utility 110 also provides statistical information pertaining to the towing activity of particular tow companies, based on the collected information.

Figure 4:
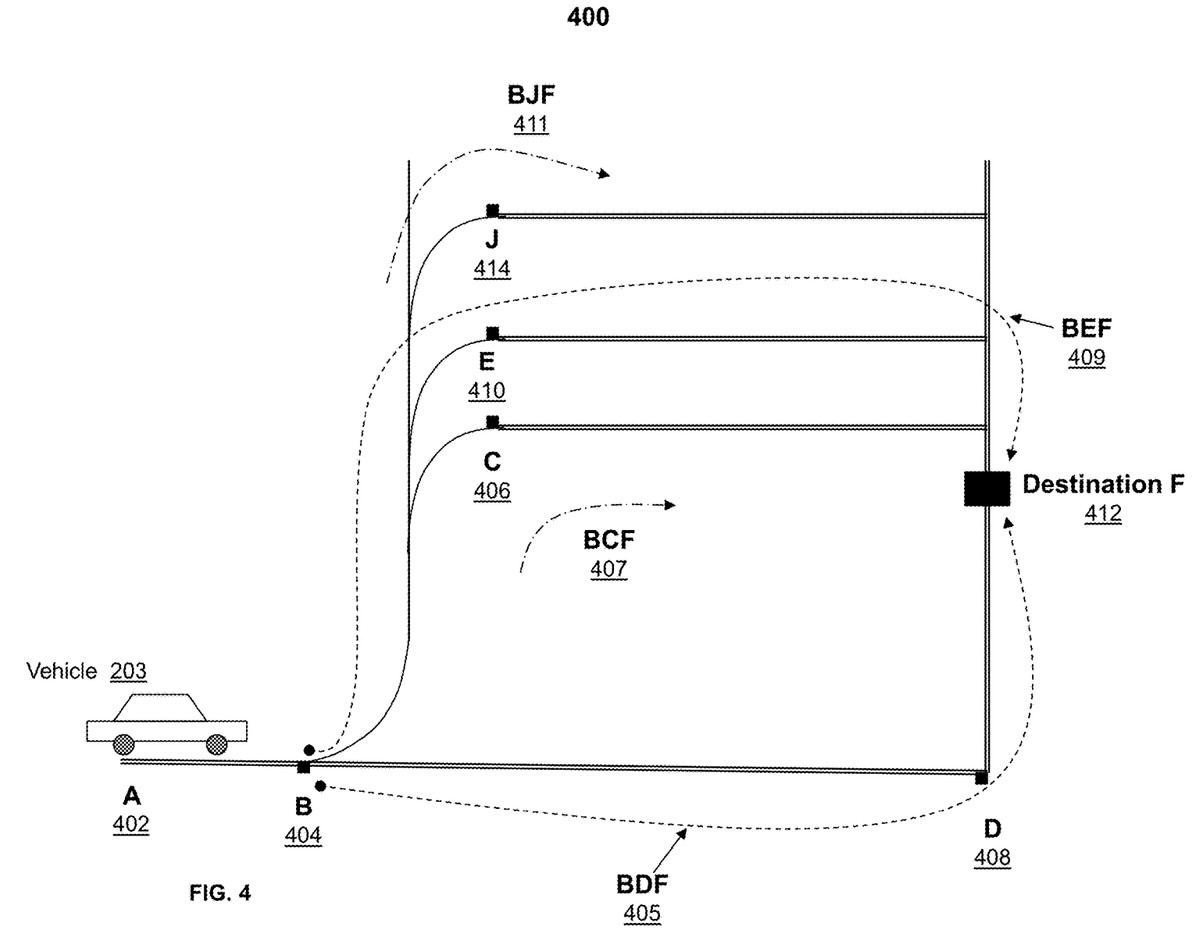
FIG. 4 illustrates a vehicle utilizing an enhanced vehicle navigation system within an area comprising an example collection of highways and roadways of various congestion levels, according to one embodiment.

FIG. 4 illustrates a vehicle utilizing an enhanced vehicle navigation system within an area comprising an example collection of highways and roadways of various congestion levels, according to one embodiment. Highway-Roadway system 400 illustrates vehicle 203 driving along first/current path AB 403. Vehicle 203 is destined for destination F 412. Highway-Roadway system 400 provides several route options for vehicle 203 to arrive at destination F 412. These route options include route-BDF 405, route-BCF 407, route-BEF 409 and route-BJF 411. INVT utility 110 enables the driver of vehicle 203 to plan the trip to destination F 412 and select the appropriate route according to the preferences/requirements of the driver. The driver/individual 212 accesses a driver account via DPS 138/CP 215 or via Navigation device 133 (illustrated in FIG. 1 and FIG. 2) to plan the trip. The driver account links the driver with navigation device 133. INVT utility 110 downloads trip data 228 to navigation device 133 to begin a trip and/or enables navigation device 133 to retrieve and utilize trip data 228 to begin a trip.

In order to effectively provide incentive for a driver to use an (more) efficient route, INVT utility 110 provides motorists with credit/cash rewards for driving along particular routes, according to traffic congestion levels. In particular, INVT utility 110 utilizes congestion information to calculate potential credit/cash rewards available to the motorist (a) if a primary route is taken or (b) if an available alternate routes is utilized. INVT utility 110 dynamically assigns obtainable credit/cash values to particular routes relative to the motorist's current location, according to traffic congestion levels. Thus, INVT utility 110 provides a motorist with credit/cash rewards according to one or more of: (a) a quantity of route options; (b) congestion levels of respective routes; and (c) route distance. For example, INVT utility 110 assigns a lower credit/cash value to high congestion routes and a higher credit/cash value to low congestion routes when both options are available to a driver. In one embodiment, INVT utility 110 compares the congestion level of a current route with congestion levels of potential alternate routes to determine the value of a particular route according to location/route history of the respective driver. For example, when INVT utility 110 receives GPS information 208 that indicates that a respective motorist drives along a route that is assigned a particular value, INVT utility 110 credits a driver account for the motorist with a reward that is based on the value dynamically assigned to the route. INVT utility 110 may provide a motorist with credit/cash rewards, according to particular schedules and locations. INVT utility 110 forwards traffic information to navigation device 133 in order to display congestion data, costs/gains data and efficiency information via navigation device 133. INVT utility 110 overlays computerized maps of driving routes with information pertaining to credit/cash rewards, according to location of the corresponding vehicle. INVT utility 110 provides indication of the route costs and/or gains/benefits pertaining to one or more of: (a) credit per unit distance for particular routes; (b) time expenditure/efficiency of a particular route; (c) relative energy (e.g., fuel, electricity) expenditure/efficiency of a particular route. In one embodiment, INVT utility 110 generates a corresponding rank for the route benefit information for each route.

Figure 5:
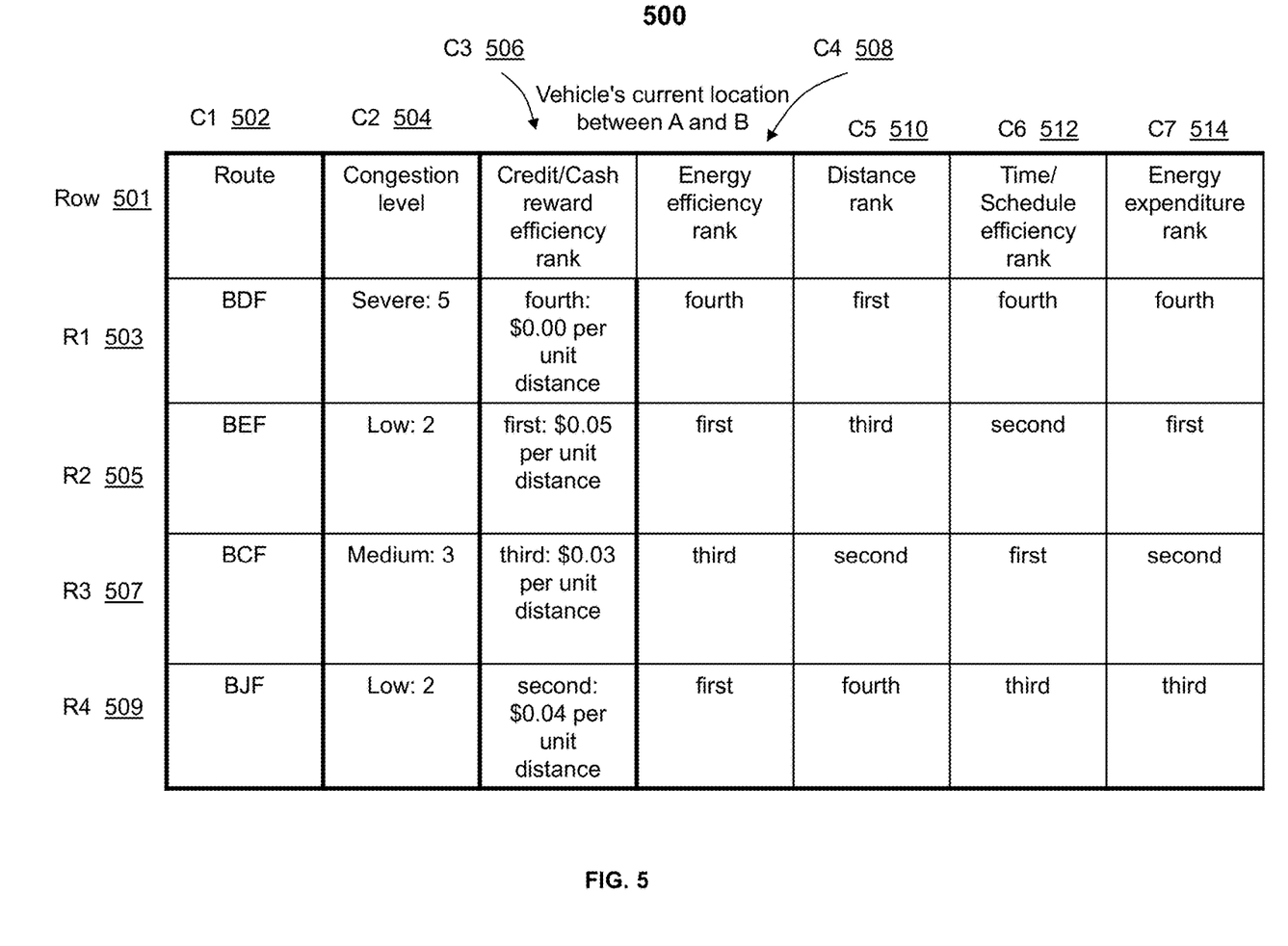
FIG. 5 illustrates an example table of costs, benefits and route efficiency data for the vehicle traveling within the collection of highways and roadways of FIG. 4, according to one embodiment.

FIG. 5 illustrates an example table of costs, benefits and route efficiency data for the vehicle traveling within the collection of highways and roadways of FIG. 4, according to one embodiment. Table 500 comprises seven columns that are respectively headed by entries within first/title row 501 of table 500. The seven columns include route-column (c1) 502, congestion level-column (c2) 504, credit/cash reward efficiency rank-column (c3) 506 and energy efficiency rank-column (c4) 508. The remaining columns from among the seven columns comprise distance rank-column (c5) 510, time/schedule efficiency rank-column (c6) 512 and energy expenditure rank-column (c7) 514. Table 500 provides information for four routes (i.e., option/potential routes) within four rows illustrated respectively by R1 503, R2 505, R3 507 and R4 509.

INVT utility 110 compares the route information provided by table 500 of various route options to select the appropriate route to destination F 412. Since driver 212 is particularly interested in reducing a carbon footprint (yet still owns a petrol powered vehicle), driver 212 plans/pre-configures the trip to destination F 412 to utilize the route which expends the least amount of energy. In one embodiment, INVT utility 110 provides the driver with a forecast of the expected route based on historical data. However, INVT utility 110 subsequently utilizes current traffic information to dynamically select the appropriate route based on the pre-configured settings. When the driver is detected within a threshold distance of a junction/point that leads to multiple route options, INVT utility 110 provides a decision based on the most recent traffic information available. For example, as illustrated by R1 503, INVT utility 110 determines that route-BDF 405 is the shortest route (i.e., first in distance rank) but most congested route (i.e., severe/level 5 congestion) to destination F 412. Of the four route options, route-BDF 405 is the route by which vehicle expends (a) the most energy/fuel and (b) the most time to arrive at destination F 412. Furthermore, INVT utility 110 does not provide driver 138 with any incentive credit/cash rewards for traveling along route-BDF 405. On the other hand, as illustrated by R2 505, INVT utility 110 determines that route-BEF 409 has low congestion (i.e., level 2 congestion), and, in particular, the lowest congestion level of the route options. In addition, INVT utility 110 determines that route-BEF 409 ranks best both in (high) energy efficiency and (low) energy expenditure. INVT utility 110 determines that route-BEF 409 satisfies the energy expenditure/rank requirements specified by the pre-configured trip data 228. Furthermore, INVT utility 110 provides the driver with the largest credit/cash reward for selecting route-BEF 409.

In comparing route-BEF 409 to route-BCF 407, INVT utility 110 determines that route-BCF 407 provides both a shorter distance and a lesser expenditure of time to destination F 412. INVT utility 110 calculates energy efficiency based on one or more of: (a) congestion level; (b) average speed; (c) average acceleration; (d) standard deviation/variance of speed (i.e., speed variations); (e) standard deviation/variance of acceleration (i.e., accelerations variations); (f) number/type of stop signs/signals; (g) a schedule/status of lights at a traffic light signal; (h) the terrain/average slope; and (i) a number of driving lanes. INVT utility 110 then calculates (normalized) energy expended by using energy efficiency and the distance along the corresponding route. Evidently, a number of factors other than distance and time may contribute to the amount of energy expended. Route- BJF 411 also has a best energy efficiency rank but the longer distance of route-BJF 411 leads to a low (third) rank for energy expenditure.

According to the preset configuration, INVT utility 110 enables display module 230 of navigation device 133 to display a computerized map to provide directions to destination F 412 by way of route-BEF 409. INVT utility 110 forwards route congestion data1 222, route cash efficiency/reward data1 224 and route energy efficiency/data1 225 to navigation device 133. Navigation device 133 displays information from the forwarded efficiency data (i.e., route congestion data1 222, route cash efficiency/reward data1 224 and route energy efficiency/data1 225) on the computerized GPS/location information map.

In one embodiment, INVT utility 110 provides indication of the route costs and/or gains/benefits on the computerized map and/or within the driver's respective account. INVT utility 110 enables the driver to plan trips and pre-configure navigation settings to select routes for a trip based upon credit reward per unit distance, efficiency levels and/or rank of routes, route segments and/or the overall trip. INVT utility 110 provides a driver with a forecast of credit rewards and/or efficiency benefits for planned trips based on data of historical averages. As a result, INVT utility 110 provides a driver with incentive and an ability to operate a vehicle in a more economically and environmentally/green friendly manner In one embodiment, INVT utility 110 links the navigation account to a pre-existing account for automatic toll payments, for example, Sun-pass®/Ez-Pass® for the Florida highway system. INVT utility 110 enables motorists to review accounts and plan trips. In one embodiment, INVT utility 110 allocates a specific proportion of advertising revenue associated with navigation application 114/driver networking application 140 to be utilized to provide motorists with credit/cash rewards/incentives for driving along various routes. In one embodiment, INVT utility 110 allows credit to be used for purchasing various products and services including, for example, vehicle related products like oil, fuel, vehicle parts, vehicle services, etc. In one embodiment, INVT utility 110 enables a driver to select a display mode to indicate locations of energy re-filling stations and/or published rates at these refueling stations which are positioned along/near routes which are displayed on the computerized maps. In one embodiment, INVT utility 110 provides a mechanism for charging drivers a fee for driving in highly congested areas. INVT utility 110 enables the driver to apply the charge for driving in highly congested areas to the driver's navigation account and/or to pay for the charge based on credits to the account.

INVT utility 110 may provide particular benefit in the transportation services industry and in particular, taxi-cab services and/or car pooling services. INVT utility 110 enables customers to automatically select (or indicate to the vehicle operator) the efficiency criteria by which to guide the trip. For example, INVT utility 110 enables a customer with a particular interest in reducing a carbon footprint to select a route to provide the most fuel efficient journey to a destination. INVT utility 110 enables a driver/passenger using a taxi-cab or individuals 240 using a carpooling service to receive credit/cash rewards to the respective member/driver accounts. INVT utility 110 provides incentive to passengers/drivers/members for particular route selections and transportation services utilized.

In one embodiment, INVT utility 110/navigation application 114 is integrated with community networking application/engine 140. INVT utility 110 utilizes features of the community networking application to enable member/drivers to form groups/sub-networks to discuss/share automobile relate experiences, for example, to plan trips and/or carpool. Thus, INVT utility 110 may perform trip/route/schedule matching to determine/identify a potential match for drivers/passengers interested in carpooling. Additionally, INVT utility 110 enables a driver to automatically report selected trip activities to a member's activities page or "wall" on a community networking website. INVT utility 110 enables online friends/fans to track (substantially) real-time activities of the driver as the trip takes place. INVT utility 110 may utilize the drivers' network to provide drivers with a preview of route conditions further ahead. For example, INVT utility 110 may enable a driver several miles ahead of other drivers to anonymously/automatically alert drivers of speed limits and/or active speed tracking operations based on radar signal detection, according to location data.

In one embodiment, based on the integration of INVT utility 110/navigation application 114 with community networking application/engine 140, drivers who are also registered members of the community networking application 140 are encouraged to build member profiles. Advertising revenue is obtained by navigation application 114 based on serving advertising content to drivers/members based on one or more of (i) information contained within member profiles, (ii) driver location information, (iii) driving routes selected by the user/driver, (iv) other preferences, and (v) online user activities within the integrated navigation and community networking applications 114, 140. For example, INVT utility 110 enables drivers to choose more environmentally friendly routes. INVT utility 110 utilizes this type of selection preference to serve an appropriate set of advertising content to the driver via applications 114, 140.

As previously described, INVT utility 110 allocates a specific proportion of received advertising revenue to provide financial rewards/incentives to respective motorists based on the driving routes the motorists select and drive along to arrive at various destinations. INVT utility 110 obtains advertising revenue based on a user's profile, preferences, online activity and/or driving activity. INVT utility 110 allows a user to provide destination information via navigation application 114 on a navigation device. In response to receiving the destination information, INVT utility 110 generates a primary route and a set of alternate routes to a same destination based on various different characteristics of the routes. In one or more embodiments, the primary route and the one or more alternate routes collectively represent trip data (e.g., trip data 228). In addition, INVT utility 110 associates various financial incentives to selected ones of the generated routes (i.e., from among the primary route and the alternate route(s)). If the driver selects a generated route which is associated with a specified reward, INVT utility 110 credits the user's online account with the corresponding cash/financial reward. This credit is applied at the time the driver arrives at the destination, and once the INVT utility confirms that the driver took the selected route to the destination. INVT utility 110 allocates a specific portion of the obtained advertising revenue to be shared among drivers based on actual driving route selections. INVT utility 110 obtains cash rewards that are credited to respective drivers' accounts from the allocated portion of the advertising revenue.

According to one embodiment, a method includes receiving, from at least one of a user device and a vehicle, current location information and information identifying a destination, the information captured via at least one device from among the user device and a navigation device associated with the vehicle, the user device and navigation device being linked to a specific user account that is interconnected via a social networking account with a social networking service capable of providing rewards and incentives to members of the social networking service based on a behavior of the members. The method further includes: a processor of the data processing system generating congestion data corresponding to available routes based on the received location information, current traffic conditions, and historical traffic data; the processor calculating credit/cash rewards efficiency data for each of the specific routes to the destination based on the generated congestion data; and transmitting and triggering display of the credit/cash rewards efficiency data for each of the available routes on a display device of the at least one of the user device and the navigation device. The method further includes: in response to receipt of a selection of a specific one of the available routes for use by a driver of the vehicle, the processor: accessing the social networking account; tagging the account for receipt of the credit/cash reward based on driver behavior (compliance with and/or use of the selected route). The method also includes: in response to the driver following the specific one of the available routes from the current location to the destination, the processor: applying a credit/cash reward to the an online financial account associated with one of the driver and the social networking account; and transmitting a notification of the application of the credit/cash reward to at least one of the user device and the navigation device.

INVT utility 110 is able to alert drivers of roads/route for which navigation is difficult or has drastically changed as a result of weather conditions and/or other emergencies. For example, INVT utility 110 uses information pertaining to the weather (e.g., the level of snowfall, rainfall or wind speed) in a particular area to the amount and/or flow of traffic on a particular route. INVT utility 110 determines whether a significant/critical level of correlation exists between the flow of traffic along particular routes and the type of weather and/or weather changes observed in the surrounding area. INVT utility 110 may compare historical traffic flow for an alternate route on a sunny day with current and/or historical data for the same route on a wintry day to discover that the traffic flow changes drastically. INVT utility 110 may determine that the alternate route is unsuitable for travel based on a threshold drop in the traffic flow level and the reported weather parameters. For example, INVT utility 110 may designate certain alternate routes as safety hazards, for a particular period, if location information is available to indicate that a driver rarely completes travel along a particular route, given certain weather/emergency conditions.

In one embodiment, INVT utility 110 is able to receive emergency reports and report incidents and other vehicle/highway emergencies to other drivers. INVT utility 110 may enable driver's to link OnStar® system to driver's account in order to receive emergency reports. Furthermore, INVT utility 110 may enable the driver to authorize the use of specific emergency reports to provide information to driver's on affected routes.

INVT utility 110 is able to alert drivers of roads/route via which cellular/wireless network service from specific providers is unavailable. In addition, INVT utility 110 enables drivers to select a route according to the quality/availability of a provider's service along the route relative to other/alternate routes. INVT utility 110 obtains respective computerized maps of network service zones for wireless network providers. In one embodiment, INVT utility 110 defines a service zone by one or more of: (a) GPS/location data; and (b) service zone distance parameters. For example, INVT utility 110 defines a service zone by GPS/location data of a central location and a distance to define a radius for a circular service zone from the central location. INVT utility 110 compares location data along a particular route with location data corresponding to a service zone to determine the service quality and service availability level along the route. INVT utility 110 provides the driver with indication of the service quality and service availability level along the route and enables the driver to select routes based on the service quality and service availability level. INVT utility 110 provides the driver with dynamic information to indicate the distance/time after which network service may be available or unavailable according to a current/identified position and relative to travel along a particular route.

Figure 6:
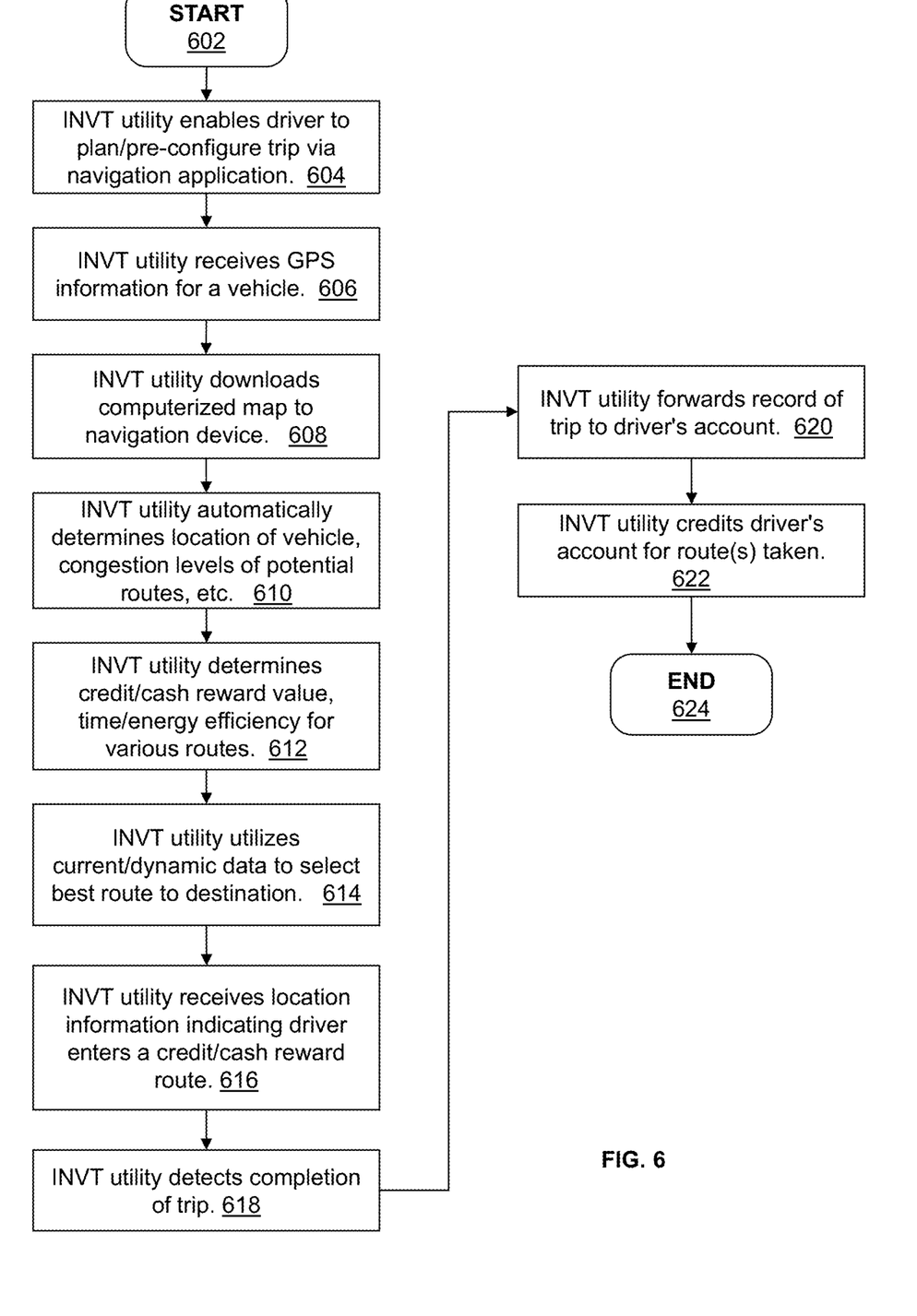
FIG. 6 provides a flow chart illustrating the process of generating congestion data for specific driving routes based on location information from a set of vehicles, obtaining rewards, costs and route efficiency data based on congestion data and applying a credit/cash reward to an account of a driver for utilizing particular driving routes, according to one embodiment.

FIG. 6 is a flow chart illustrating the process of generating congestion data for specific driving routes based on location information from a set of vehicles, obtaining rewards, costs and route efficiency data based on congestion data and applying a credit/cash reward to an account of a driver for utilizing particular driving routes, according to one embodiment. The process of FIG. 6 begins at initiator block 602 and proceeds to block 604, at which INVT utility 110 enables individual 212 to pre-configure a trip via navigation application 114. At block 606, INVT utility 110 receives GPS information and/or ID information for a vehicle from navigation device/system 133. At block 608, INVT utility 110 downloads a computerized map to navigation device 133, according to trip data 228. In one embodiment, trip data 228 includes directions to a particular location. At block 610, INVT utility 110 automatically determines the location of vehicle 203 and congestion levels of potential routes, according to trip data 228. At block 612, INVT utility 110 determines credit/cash reward value, time/energy efficiency for various route options.

At block 614, according to trip data 228, INVT utility 110 selects a route to a destination based on one or more of: (a) pre-selected route; (b) cost/benefit information based on historical data to select best route to destination; (c) cost/benefit information based on most recent data to select best route to destination; and (d) other criteria.

Figure 7:
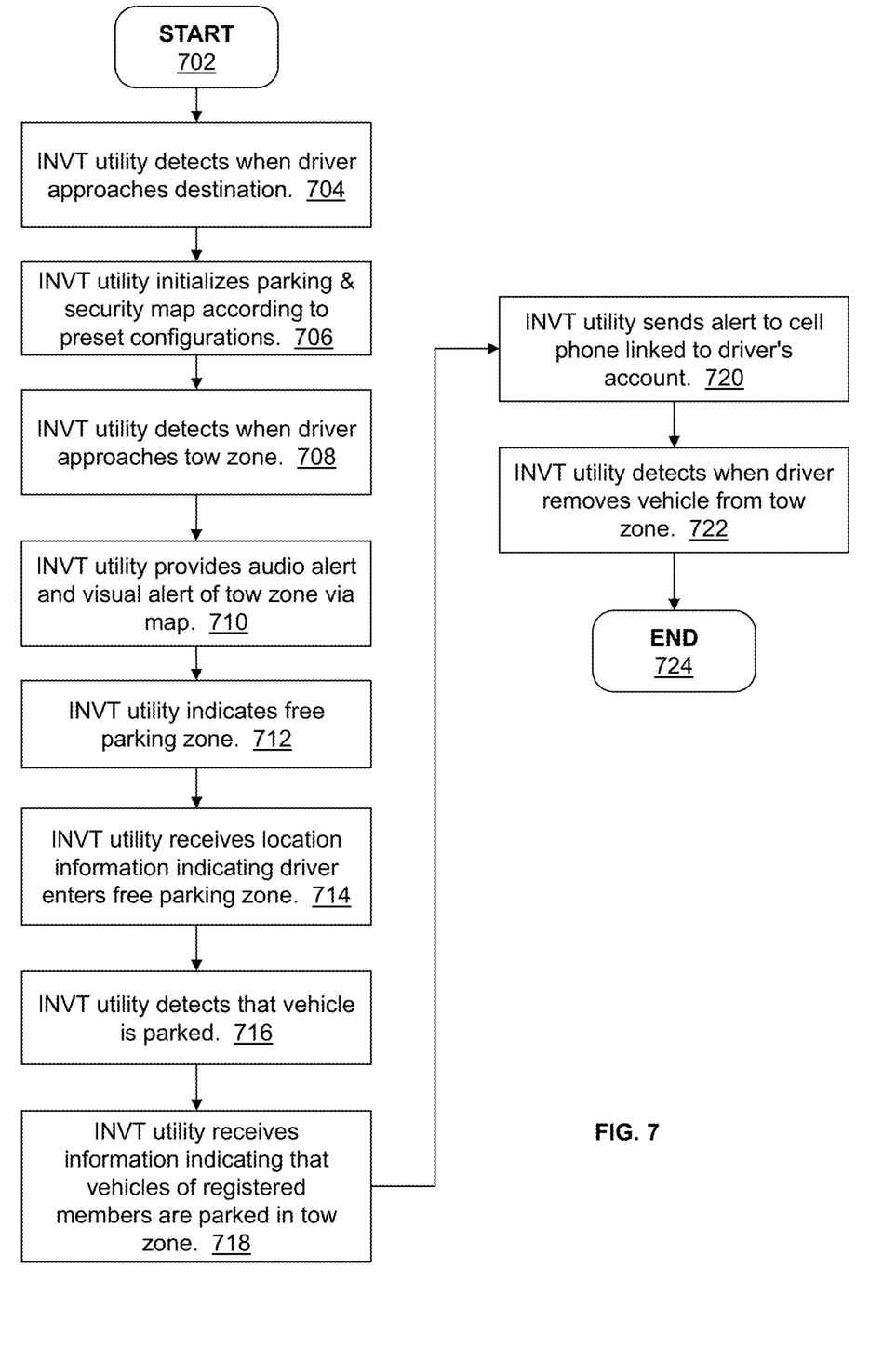
FIG. 7 is a flow chart illustrating the process of initiating a parking module based on the detected location of a vehicle, sending warnings/alerts to the driver when the vehicle approaches parking spaces and tow zones, utilizing a network of drivers to warn drivers of towing activity and illicit/theft activities pertaining to vehicles, according to one embodiment.

At block 616, INVT utility 110 receives location information indicating driver enters a credit/cash reward route. At block 618, INVT utility 110 detects completion of the route/trip when the driver reaches the destination and/or parks the vehicle (FIG. 7). At block 620, INVT utility 110 forwards a record of the trip to the driver's account. At block 622, INVT utility 110 calculates and credits driver's account for trip/route(s) taken. The process ends at block 624.

FIG. 7 is a flow chart illustrating the process of initiating a parking module based on the detected location of a vehicle, sending warnings/alerts to the driver when vehicle approaches parking spaces and tow zones, utilizing a network of drivers to warn drivers of towing activity and illicit/theft activities pertaining to vehicles, according to one embodiment. The process of FIG. 7 begins at initiator block 702 and proceeds to block 704, at which INVT utility 110 detects when driver 212 approaches within a threshold distance of destination 412. At block 706, INVT utility 110 initializes parking & security map according to preset configurations/trip data 228. At block 708, INVT utility 110 detects when driver 212 approaches tow zones.

At block 710, INVT utility 110 provides audio alert and/or visual alert of tow zones via map. At block 712, INVT utility 110 indicates free parking zone. At block 714, INVT utility 110 receives location information indicating driver enters free parking zone. At block 716, INVT utility 110 detects that vehicle is parked. At block 718, INVT utility 110 receives information indicating that vehicles of registered members are parked in tow zone. At block 720, INVT utility 110 sends alert to cell phone linked to driver's account. At block 722, INVT utility 110 detects when driver removes vehicle from tow zone. The process ends at block 724.

The illustrated and described embodiments provide, in a data processing system, a method, a system and a computer program product for developing interactive smart highway systems and intelligent vehicle tracking/navigation systems. The intelligent navigation and vehicle tracking (INVT) utility executes on a data processing system and collects/generates vehicle activity and location information for vehicles equipped with an intelligent navigation device. In particular, the INVT utility obtains GPS/location data for various vehicles from information provided by the corresponding navigation device. The INVT utility uses the received location information to calculate congestion, identify alternate routes. Additionally, the INVT utility provides an incentive mechanism for motorists to receive credit/cash rewards for taking less congested routes. In addition, the INVT utility utilizes congestion data to determine the time efficiency and energy efficiency for traveling along particular routes. Furthermore, the INVT utility enables motorists to select routes based on energy expended, time expended and/or available credit/cash rewards.

The INVT utility also assists vehicle operators to locate approved/safe parking spaces/areas and zones. The INVT utility creates a current and comprehensive map of parking spaces and tow zones within various locations. In particular, the INVT utility provides alerts for drivers to avoid parking in tow zones and other restricted parking spaces when the INVT utility receives location information for a driver's vehicle which information indicates the driver is approaching a restricted parking space. The INVT utility enables drivers to utilize a network of drivers to warn drivers of towing activity and illicit/theft activities pertaining to vehicles. The INVT utility may utilize the drivers' network to provide drivers with a preview of what lies ahead (i.e., road/route conditions further along a current route). For example, a driver several miles ahead of other drivers may anonymously/automatically alert drivers of speed limits and/or active speed tracking operations based on radar signal detection, according to location data.

In one embodiment, the INVT utility may also be utilized in maritime applications for intelligent navigation and networked security for boats, yachts and other marine vessels.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional wireless communication system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a computer implemented method comprising:
receiving, from at least one of a user device and a vehicle, current location information and information identifying a destination, the information captured via at least one device from among the user device and a navigation device associated with the vehicle, the user device and navigation device being linked to a specific user account that is interconnected via a social networking account with a social networking service capable of providing rewards and incentives to members of the social networking service based on a behavior of the members;
a processor of the data processing system generating congestion data corresponding to available routes based on the received location information, current traffic conditions, and historical traffic data;
the processor calculating credit/cash rewards efficiency data for each of the specific routes to the destination based on the generated congestion data;
transmitting and triggering display of the credit/cash rewards efficiency data for each of the available routes on a display device of the at least one of the user device and the navigation device;
in response to receipt of a selection of a specific one of the available routes for use by a driver of the vehicle, the processor: accessing the social networking account; tagging the account for receipt of the credit/cash reward based on driver behavior; and
in response to the driver following the specific one of the available routes from the current location to the destination, the processor: applying a credit/cash reward to an online financial account associated with one of the driver and the social networking account; and transmitting a notification of the application of the credit/cash reward to at least one of the user device and the navigation device.

2. The computer-implemented method of claim 1, further comprising:
the processor evaluating energy efficiency data for specific routes based on (i) the generated congestion data and (ii) variations in acceleration rates from a set of vehicles;
downloading computerized maps providing a driver with information, via an output device, about one or more of: (a) pre-selected types of establishments; (b) cellular wireless network signal service levels/availability;
enabling drivers with registered driver accounts to establish driver sub-networks to share specific information with other drivers/members/friends within the same sub-network;
obtaining advertising revenue based on a user's profile, preferences, online activity and driving activity; and
allocating a specific portion of the advertising revenue to be shared among drivers based on actual driving route selections.

3. The method of claim 1, further comprising:
receiving destination information via the navigation device;
in response to receiving the destination information, generating a primary route and one or more alternate routes to a same destination;
associating various financial incentives/rewards to selected ones of the generated routes; and
in response to the driver's selecting a generated route that is associated with a specified financial reward, crediting, by the processor, the user's online account with the corresponding financial reward; and
wherein financial rewards are credited to respective drivers' online accounts from the allocated portion of advertising revenue finances.

4. In a data processing system, a computer implemented method comprising:
receiving location information and data about a pre-established trip from one or more vehicles each having a respective navigation device;
retrieving a comprehensive computerized map of parking spaces and tow zones within a target area;
a processor of the data processing system providing, via an output device, navigation information that identifies to vehicle operators and enables vehicle operators to locate at least one of approved parking spaces and safe parking spaces within the target area; and
the processor providing, via the output device, one or more alerts for the vehicle operators to avoid parking in tow zones and other restricted parking spaces, in response to receipt by the processor, of location information that indicates the driver's vehicle is in close proximity of a restricted parking space.

5. The computer implemented method of claim 4, wherein said providing alerts further comprises:
transmitting alerts to other devices linked, via a wireless network, to the navigation device including at least one of the cell phone of the vehicle operators and a cell phone of an associated of the vehicle operators.

6. The computer implemented method of claim 4, further comprising:
receiving location information and data about a pre-established trip from one or more vehicles each having a respective navigation device;
determining current levels of traffic flow along a particular route based on location data from one or more vehicles;
receiving information about current weather conditions;
a processor of the data processing system determining a level of correlation between traffic flow on selected routes and weather, based on historical data; and
the processor providing an identification of safe and hazardous routes for travel via a navigation system, based on the current traffic flow and the level of correlation between associated traffic flow and related weather conditions.

7. The computer implemented method of claim 6, further comprising:
comparing current and historical traffic flow for an alternate route corresponding to a particular weather condition; and
determining whether the alternate route is suitable for travel if at least a threshold change in traffic flow level between the current and historical traffic flow is detected.

8. The computer implemented method of claim 6, further comprising:
respectively providing information to one or more associated vehicles to enable associated drivers within corresponding cars to track each other on a same road trip, based on the pre-established trip data, wherein said information provided includes an indication of (a) identification of other associated drivers; (b) relative distances between associated drivers; and (c) relative directions towards other drivers.

9. In a data processing system, a computer implemented method comprising:
- a processor receiving location information and destination data about a pre-established trip from one or more vehicles each having a respective navigation device;
- retrieving respective computerized maps of network service zones for various wireless network providers, wherein said computerized maps provide information about quality and availability of a provider's service along selected routes;
- a processor of the data processing system comparing a driver's location data to location data for a service zone to determine the service quality and service availability level at a current location along the route;
- generating a map with navigation information, the navigation information indicating network service quality and service availability level along each of multiple routes to enable the driver to select a route based on the network service quality and service availability level;
- outputting selection options form among the multiple routes via an output device communicatively coupled to the processor; and
- in response to receipt of a selection of a particular one of the selection options, displaying, on the display device accessible to the driver, at least one of a directional map and navigation information that includes the network service quality along the selected route.

10. The method of claim 9, wherein said displaying the navigation information further comprises providing, via the output device, the driver with dynamic navigation information to indicate at least one of an identified distance before and an identified time after which service becomes available on a particular wireless communication network, based on location information associated with travel along a particular route.

* * * * *